United States Patent Office 2,757,197
Patented July 31, 1956

2,757,197

STABILIZED AROMATIC AMINES

Adrian L. Linch, Wilmington, Del., assignor to E. I. du Pont de Nemours and Company, Wilmington, Del., a corporation of Delaware No Drawing. Application January 21, 1952,
Serial No. 267,504

19 Claims. (Cl. 260—578)

This invention relates to aromatic amines which have been stabilized against atmospheric oxidation, particularly by having incorporated therein small proportions of a new class of anti-oxidants therefor.

It has long been recognized that aromatic amines tend to become rapidly oxidized through contact with air which results in loss of the aromatic amines and decrease in their quality through contamination by the oxidation products. When aromatic amines have acquired a dark color from exposure to air, they are not suitable for the manufacture of azo dyes, pigments, basic colors, vat dyes, pharmaceuticals, rubber chemicals, etc. In practice, such oxidation has been largely avoided by consuming the amines within a few days of their production or the amines have been purified, by distillation or crystallization, just prior to their use. In some cases, the loss of unstabilized amine has been as high as 1% per week and the accumulated oxidation products have adversely affected the yield of substances prepared therefrom, such as azo dyes, by as much as 10%.

In industrial practice, the close scheduling of the production of the amines with the processes in which the amines are consumed has become increasingly less practical. The storage of amines, which deteriorate so that they require purification before use, is prohibitively costly because of the loss of amine by oxidation and the further losses incurred in the purification processes.

Attempts to stabilize aromatic amines, by the use of conventional anti-oxidants employed for stabilizing other substances, have not been commercially successful because such anti-oxidants are inefficient or inoperative. In many cases, such conventional anti-oxidants produce negative results in the aromatic amines; that is, they act as pro-oxygenic catalysts. Also, most metal deactivating agents actually increase the susceptibility of the aromatic amines to attack by atmospheric oxygen.

A. E. Robertson, in Patent No. 2,434,651, proposes to stabilize aromatic amines by adding carbon bisulfide thereto, which carbon bisulfide tends to liberate hydrogen sulfide. While carbon bisulfide and hydrogen sulfide are quite effective anti-oxidants for aromatic amines, they are gases which readily escape from the amines, are obnoxious and toxic and present explosion and corrosion hazards which greatly reduce their utility.

Herbst, in Patent No. 2,422,484, has also proposed the stabilization of certain alkaryl amines with aromatic mercaptans. However, in general, such aromatic mercaptans are not particularly effective in such amines and some of them, after a short period, invert to pro-oxygenic catalysts in such amines. Also, some of such aromatic mercaptans are inoperative with some amines and actually increase the susceptibility of such amines to atmospheric oxidation.

It is an object of my invention to provide a certain class of aromatic amines containing a class of compounds which are particularly effective to inhibit oxidation of such amines and which do not invert to pro-oxygenic catalysts therein. Another object is to provide a class of aromatic amines which are effectively stabilized against atmospheric oxidation, whereby loss of amine by oxidation is prevented, contamination of the amine by oxidation products is reduced and the deleterious effects of the oxidation products in the amine are avoided. A further object is to provide a novel and improved method for stabilizing a specific class of aromatic amines. Further objects are to provide new compositions of matter and to advance the art. Still other objects will appear hereinafter.

The above and other objects may be accomplished in accordance with my invention which comprises incorporating in an aromatic amine of the formula R—NH$_2$ wherein R is a substituted phenyl radical in which the substituents are of the class consisting of an NH$_2$ group, both an NH$_2$ group and an alkyl group of 1 to 3 carbon atoms, an alkoxy group of 1 to 3 carbon atoms, and both an alkoxy group of 1 to 3 carbon atoms and an alkyl group of 1 to 3 carbon atoms, from about 0.01% to about 0.5% of an aromatic mercaptan of the formula R'—SH wherein R' is a member of the class of mercaptonaphthyl radicals, a phenyl radical, and substituted phenyl radicals in which the substituents are selected from 1 to 2 alkyl groups of 1 to 3 carbon atoms, 1 to 2 carboalkoxy groups of 2 to 4 carbon atoms, and both a mercapto group and an alkyl group of 1 to 3 carbon atoms.

I have found that such aromatic mercaptans are efficient anti-oxidants for such aromatic amines. They effectively inhibit oxidation of such aromatic amines and prevent loss of the amine by oxidation, reduce contamination of the amine by oxidation products and avoid the synergistic action of the oxidation products in subsequent chemical processes in which the amines are employed. The resulting stabilized aromatic amines may be stored for relatively long periods of time, thereby obviating the necessity for close scheduling of the amine production with the process in which the amine is consumed and usually making costly purification processes unnecessary. Such aromatic mercaptans are also effective to protect the amines in the processes by which they are manufactured so that higher yields of amine of better quality can be obtained. Such aromatic mercaptans are known to the art and can be made readily at reasonable cost by methods well-known to those skilled in the art.

Through extensive research with many aromatic amines and many anti-oxidants, I have found that few, if any, antioxidants are effective with all aromatic amines, the susceptibility of any aromatic amine to stabilization by any specific anti-oxidant depending upon the presence or absence of substituent groups upon the aromatic nucleus of the amine, upon the character of the substituent groups and, frequently, upon the character of the aromatic nucleus. For example, some of the aromatic mercaptans of my invention are ineffective, or have but little effect, in aromatic amines that are outside the scope of my invention, in some cases, actually accelerating oxidation of the amines. Also, many aromatic mercaptans, that are outside the scope of my invention, are ineffective or substantially ineffective to stabilize the aromatic amines of my invention, in some instances, actually accelerating oxidation of the amines.

The aromatic amines, which can be effectively stabilized by the aromatic mercaptans of my invention, are the phenylene diamines, represented by meta-phenylene diamine; the amines of the formula R—NH$_2$ wherein R represents a disubstituted phenyl radical in which one substituent is an NH$_2$ group and the other substituent is an alkyl group of 1 to 3 carbon atoms, represented by the toluylene diamines; the amines of the formula R—NH$_2$ wherein R represents a monosubstituted phenyl radical in which the substituent is an alkoxy group of 1 to 3 carbon atoms, represented by the anisidines and the phenetidines; and the amines of the formula R—NH₂ wherein R represents a disubstituted phenyl radical in which one substituent is an alkoxy group of 1 to 3 carbon atoms and the other substituent is an alkyl group of 1 to 3 carbon atoms, represented by cresidine. My invention is particularly valuable for the stabilization of meta-phenylene diamine, the anisidines, and the toluylene diamines.

The aromatic mercaptans, which are effective as anti-oxidants for the specified class of aromatic amines of my invention, are thiophenol; the naphthalene-dithiols (dimercapto naphthalenes), represented by naphthalene-1,5-dithiol and naphthalene-1,4-dithiol; the mercaptans of the formula R'—SH wherein R' represents a monosubstituted or disubstituted phenyl radical in which each substituent is an alkyl group of 1 to 3 carbon atoms, represented by o-thiocresol and the xylyl mercaptans; the mercaptans of the formula R'—SH wherein R' represents a monosubstituted or disubstituted phenyl radical in which each substituent is a carboalkoxy group of 2 to 4 carbon atoms, preferably a carbomethoxy group, represented by the mercapto-methyl-benzoates and the mercapto-dimethyl-terephthalates; and the mercaptans of the formula R'—SH wherein R' represents a disubstituted phenyl radical in which one substituent is an SH group and the other substituent is an alkyl group of 1 to 3 carbon atoms. The preferred aromatic mercaptans are the mercapto-methyl-benzoates and the xylyl mercaptans. The "xylyl mercaptans" employed in the examples is a mixture of isomeric mercaptans obtained by the reduction of the xylyl sulfonyl chlorides resulting from the treatment of commercial 3° xylene with chlorosulfonic acid. The 3° xylene is a mixture of xylenes containing about 14% ortho xylene, about 55% meta xylene, and about 22% para xylene. Such mixture of xylyl mercaptans is preferred.

It will be understood that, in the definitions of the aromatic amines and the aromatic mercaptans of my invention in the specification and claims, I employ the term "phenyl radical" in its most restricted sense to mean the simple radical, unsubstituted except to the extent specifically indicated, in which the free valence belongs to a carbon of the benzene ring, and that each specified substituent group is directly bonded to a carbon of the benzene ring. Also, the terms "phenylene diamines," "thiophenol," "napthalene-dithiols," and "mercaptonaphthyl radicals" are used in their most restricted sense to mean the unsubstituted compounds or radicals. The term "carboalkoxy groups of 2 to 4 carbon atoms" means the radical

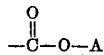

wherein A represents an alkyl group of 1 to 3 carbon atoms, the free valence of such radical being satisfied by a carbon of the benzene ring.

The concentration of the anti-oxidant in the amine should be from about 0.01% to about 0.5% by weight, preferably, from about 0.02% to about 0.3%, and usually about 0.1%. While the anti-oxidants of my invention may be effective in concentrations above 0.5%, such higher concentrations will generally be objectionable as they would contaminate the amine to an undesirable extent. Also, concentrations below 0.01% of anti-oxidant will usually show some effect, but such effect will generally be insufficient for practical purposes.

Not all of the aromatic mercaptans (anti-oxidants) of my invention are equally effective for all of the aromatic amines of my invention. Accordingly, the particular anti-oxidant and the concentration employed for each of the aromatic amines will be chosen in accord with the degree of stability desired. Also, the choice of anti-oxidant and the concentration thereof will be governed by the conditions to which the aromatic amine will be exposed, such as light, temperature and atmospheric contact. Light acts as a catalyst for the oxidation of the aromatic amines and hence, if the amine is to be exposed to light for any substantial period of time, it will be necessary to materially increase the concentration of the anti-oxidant. Furthermore, the rate of oxidation of the aromatic amine increases with increase in temperature, so that the concentration of the anti-oxidant should be increased when the amine is to be subjected to temperatures above atmospheric. Furthermore, the rate of oxidation of the aromatic amine varies with variation in the extent of its exposure to air or oxygen and higher concentrations of anti-oxidant will be required when the amine is to be exposed to air to any material extent. Therefore, it will be understood that the anti-oxidants exhibit their maximum efficiency under storage conditions which involve room temperature or lower temperatures, exclude light, and provide a minimum contact with air or oxygen, as in closed metal tanks and drums.

In order to obtain optimum stability of the amine, I generally prefer to add the aromatic mercaptans to the aromatic amine as soon as the amine is prepared, particularly, immediately after distillation or during crystallization of the amine. If the amine is distilled, minimum contact thereof with oxygen and maximum stabilization are obtained if the amine is distilled into a receiver containing the anti-oxidant. However, the application of my invention is not restricted to freshly prepared amines, as the anti-oxidant may be added to an aromatic amine which has been partially oxidized, and the anti-oxidant will effectively retard further oxidation of the amine. Also, the anti-oxidants may be added during the manufacture of the amine to avoid atmospheric oxidation during such manufacture, to thereby obtain the amine in higher yields and better quality. In particular, the anti-oxidant may be added to the crude amine, before purification of the amine by crystallization, to thereby inhibit oxidation of the amine during the drying operation.

If the aromatic amine is liquid at normal temperatures, the anti-oxidant may be simply added thereto in the desired concentration and dissolved therein. If the amine is a solid at atmospheric temperatures, it may be melted or dissolved in an inert liquid solvent and the anti-oxidant added to the melted amine or to the solution. Also, if the anti-oxidant is not soluble in the aromatic amine to the extent desired, it may be added as a solution in a suitable liquid solvent, such as ethanol, isopropyl alcohol and ether. The anti-oxidants effectively stabilize the aromatic amines in the presence of inert liquid solvents and diluents.

Examples are given hereinafter, illustrating the effect of representative aromatic mercaptans of my invention in stabilizing representative aromatic amines, some of such examples including tests with other mercaptans and with other amines for purposes of comparison. The tests with liquid aromatic amines were carried out in clear glass bottles filled to approximately 75% of their capacity with the amine or stabilized amine and exposed to diffused daylight at room temperature. The bottles were capped but not sealed airtight. In the absence of practical specific analytical methods for direct determination of the concentration of oxidation products in the preliminary stages, the rate of formation of visible color was adopted at the basis for the determination of anti-oxidant activity. The development of color follows an orderly sequence which is related to the extent of oxidation. In nearly every case, the first visible indication of oxidation is produced by derivatives which impart a yellow color to the system, followed by further oxidation to red compounds. Final stages of oxidative decomposition were evidenced by the appearance of green and blue components. Although the oxidation follows a complex series of reactions, and the constitutions of many of the intermediate products are unknown, the autocatalytic nature of the system can be easily demonstrated.

Evaluation of anti-oxidants, which are effective inhibitors for atmospheric oxidation of the aromatic amines, has disclosed a certain amount of specificity in the chain of reactions. Whereas, certain inhibitors suppress the initial oxidation to yellow derivatives, the oxidation rate of these yellow components, which do form, to the red stage is only slightly reduced. Other inhibitors are only partially effective in suppressing the production of the initial yellow derivatives, but effectively prevent oxidation to red products. Similar results have been observed in the red to blue-green developement states. Therefore, in order to establish a common basis for quantitative evaluation of anti-oxidant efficiency, the rate of formation of each of these three color classes, as well as total visible color formation, was evaluated as optical density determined in a Cenco-Sheard-Sanford Photelometer, using blue (central maximum=410 millimicrons), green (525 millimicrons) and red (610 millimicrons) filters and no filter. Distilled water was used as the reference standard, and the density expressed as per cent transmission. Experience has shown that the use of aromatic amines, darker than a red-amber color do not produce satisfactory results in chemical processes. Therefore, when oxidation has progressed to an extent sufficient to reduce the total light transmission below 75%, blue transmission below 20%, green below 60% and red below 95%, the amine is considered to be unsuitable for use without purification. The sum of the number of days required to reach each of these four values is designated as the index. The anti-oxidant index is obtained by subtracting the index of the unstabilized control sample from the index of the stabilized material. This method minimizes the small variations in oxidation susceptibility exhibited by individual producton lots of most amines.

Evaluation of those amines, which are normally solid at room temperature, was carried out somewhat differently. The anti-oxidant was dissolved in the amine at a temperature sufficiently high to maintain a liquid state. The test was then conducted at that temperature, or the solution was permitted to freeze and the test continued at normal temperature. Since light density measurements were not practical, the progress of the oxidation was estimated visually. The amine was considered unsuitable for use when the color change had progressed to a dark red, dark brown, or dark lavender shade. Since a control sample, containing no anti-oxidant, was tested at the same time, personal variations in judgment of color depth largely canceled out. In order to place these evaluations on the same index basis adopted for liquid amines, the number of days elapsed to the end point was multiplied by four. In several cases, the crystallizing point was used as the criterion of anti-oxidant efficiency.

In order to further show the effectiveness of the anti-oxidants of my invention, the ratio of the stability of the stabilized amine to the stability of the unstabilized amine may be calculated by dividing the index of the stabilized amine by the index of the unstabilized amine (control index). This ratio is the "stability ratio." This stability ratio expresses the relation of the storage life of the stabilized amine to the storage life of the unstabilized amine under the same conditions. For example, a stability ratio of 2 indicates that the stabilized amine requires twice as long as the unstabilized amine to reach the final stage of oxidative decomposition where it is considered to be unsuitable for most uses; that is, the stabilized amine has a storage life 2 times that of the unstabilized amine.

Example 1

A sample of 2,4-toluylene diamine, which had a melting range of 96.8–97.4° C., was distilled at 141–142° C. at a pressure of 2–3 mm. of mercury to obtain a colorless product for evaluation. Then 0.15 g. of 2-mercapto-methyl-benzoate was added to 50 g. of the molten amine at 98–100° C., with stirring, until it was all dissolved. The anti-oxidant index of an untreated sample was 8 and that of the treated sample was 880, after room temperature storage.

Example 2

The sample of 2,4-toluylene diamine for this example was light amber in color, crystallizing at 97.5° C. and distilling at 125–130° C. and 3 mm. It was tested in 50 cc. samples into which the inhibitors were incorporated in the indicated amounts. These agents were dissolved by placing each sample in a 115° C. oven for two hours. The samples were then stored at 70° C. and the color changes observed periodically. The index for the unstabilized amine was 24. The following results were obtained:

| Inhibitors | wt. percent | Anti-oxidant Index |
|---|---|---|
| thiophenol | 0.1 | 84 |
| o-thiocresol | 0.1 | 32 |
|  | 0.5 | 112 |
| xylyl mercaptans | 0.25 | 84 |
|  | 0.1 | 56 |
|  | 0.02 | 20 |
| naphthalene-1,5-dithiol | 0.1 | 56 |
| 2-mercapto-methyl-benzoate | 0.1 | 56 |
|  | 0.02 | 16 |
| 3-mercapto-methyl-benzoate | 0.1 | 84 |
| 4-mercapto-methyl-benzoate | 0.1 | 40 |
| acetyl-3-mercapto-methyl-benzoate | 0.1 | 100 |
| 3,4-dimercapto toluene | 0.1 | 56 |

Example 3

Meta-phenylene diamine was distilled at 1–5 mm. pressure of mercury to obtain a fresh colorless product for anti-oxidant tests. It had a crystallizing point of 62.8–62.9° C. Thiophenols were added (to the extent of 0.1% by weight) to molten portions of the m-phenylene diamine at 70° C. and stirred until the thiophenols dissolved. They were stored at 70° C. The unstabilized amine had an index of 4. The following results were obtained:

| Inhibitors | Anti-oxidant Index |
|---|---|
| thiophenol | 32 |
| o-thiocresol | 32 |
| xylyl mercaptans | 32 |
| naphthalene-1,4-dithiol | 56 |
| 2-mercapto-methyl-benzoate | 24 |
| 3-mercapto-methyl-benzoate | 76 |
| 4-mercapto-methyl-benzoate | 32 |
| mercapto-dimethyl-terephthalate | 24 |

For comparison, other mercaptans gave the following:

Anti-oxidant index
Pinene mercaptan _____ 0
Benzyl mercaptan _____ 0
3,3,5-trimethyl cyclohexyl mercaptan _____ 0
Thio-alpha-naphthol _____ 0

Also, when thioglycolic acid and its ethyl ester were similarly tested in the meta-phenylene diamine, each stabilized the amine for a short period and then inverted to a pro-oxygenic catalyst, accelerating oxidation of the amine.

Example 4

Samples of ortho-anisidine, which had crystallizing points above 5° C., were distilled at a pressure of 10 mm. at 101°–104° C. to obtain a colorless product for evaluation in 50 cc. aliquots by the addition of inhibitors in the indicated concentrations. The samples were then stored at room temperature in clear glass, lightly stoppered bottles and the color changes observed periodically. The indexes for the samples of unstabilized amine and the results obtained are listed in the following table:

| Inhibitors | Control Index | wt. percent | Anti-oxidant Index |
|---|---|---|---|
| xylyl mercaptans | 30 | 0.1 | 110 |
| naphthalene-1,5-dithiol | 44 | 0.1 | 64 |
| 3-mercapto-methyl-benzoate | 30 | 0.1 | 66 |

*Example 5*

The para-anisidine for this example was distilled at 3–4 mm. at 103°–104° C. from crude para-anisidine, obtained from hydrogenation of para-nitroanisole. The distilled product was pale yellow in color and crystallized at 56.2° C. Tests were carried out in 50 cc. aliquots into which the inhibitors were incorporated in the indicated amounts at 70°–75° C. The samples were then stored at 70° C. in clear glass open mouth bottles and the color changes observed periodically. The index for the unstabilized amine was 4. The following results were obtained:

| Inhibitors | wt. percent | Anti-oxidant Index |
|---|---|---|
| xylyl mercaptans (mixture) | 0.1 | 12 |
| 3,4-dimercapto toluene | 0.1 | 8 |
|  | 0.02 | 4 |
| naphthalene-1,5-dithiol | 0.1 | 16 |
| 3-mercapto-methyl-benzoate | 0.1 | 4 |

*Example 6*

Cresidine (2-methoxy-5-methyl-aniline) was distilled at 8 mm. mercury pressure at 113°–114° C. to obtain a nearly colorless product for anti-oxidant evaluation. Aromatic mercaptans were added in quantities sufficient to produce a concentration of 0.1% by weight at 70°–75° C. and stirred until dissolved. The aliquots were stored at 70°±2° C. exposed to the atmosphere with the following results:

| Inhibitors | Anti-oxidant Index |
|---|---|
| Untreated control | 8 |
| thiophenol | 20 |
| xylyl mercaptans (mixed isomers) | 24 |
| naphthalene-1,5-dithiol | 24 |
| 2-mercapto-methyl-benzoate | 16 |
| 3-mercapto-methyl-benzoate | 12 |
| acetyl-3-mercapto-methyl-benzoate | 16 |

For comparison, other mercaptans gave the following:

| Inhibitors | Anti-oxidant Index |
|---|---|
| tertiary dodecyl mercaptan | −4 |
| 3,3,5-trimethyl cyclohexanethiol | −4 |
| thioglycolic acid | −4 |
| thioanisole | 0 |
| pinene mercaptan | −4 |

*Example 7*

This example is presented for purposes of comparison and shows the effect of various mercaptans in other aromatic amines tested in a manner similar to those in the preceding examples. The minus anti-oxidant indexes show the extent to which the mercaptans accelerated oxidation of the amines. The results are as follows:

ANILINE

| Mercaptans | wt. percent | Anti-oxidant Index |
|---|---|---|
| Untreated control | | 408 |
| 2-mercapto-methyl-benzoate | 0.1 | −140 |
| di(2-mercaptobenz) anilide | 0.1 | −124 |

ORTHO-TOLUIDINE

| | | |
|---|---|---|
| Untreated control | | 210 |
| thio-beta-naphthol | 0.1 | −10 |
| thiosalicylic acid | 0.5 | −70 |
| pinene mercaptan | 0.1 | −15 |
| mercapto-dimethyl-terephthalate | 0.1 | −60 |
| thiophenol | 0.1 | 96 |
| xylyl mercaptans | 0.1 | 120 |
| 2-mercapto-methyl-benzoate | 0.5 | 23 |

PARA-TOLUIDINE

| | | |
|---|---|---|
| Untreated control | | 8 |
| 3-mercapto-methyl-benzoate | 0.1 | −4 |

2-CHLORO-4-AMINO TOLUENE

| | | |
|---|---|---|
| Untreated control | | 90 |
| xylyl mercaptans | 0.5 | −60 |
| thiosalicylic acid | 0.5 | −80 |
| 2-mercapto-methyl-benzoate | 0.1 | 0 |

XYLIDINES

| | | |
|---|---|---|
| Untreated control | | 70 |
| 2-mercapto-methyl-benzoate | 0.1 | 33 |
| 3-mercapto-methyl-benzoate | 0.1 | 0 |

It will be understood that the preceding examples are given solely for illustrative purposes and that I do not intend to limit my invention to the specific embodiments disclosed therein. It will be apparent to those skilled in the art that other aromatic amines, within the class heretofore disclosed, may be similarly stabilized. It will also be apparent that other aromatic mercaptans, within the class hereinbefore defined, and mixtures of any two or more thereof may be substituted for those of the examples. It will be further apparent that the concention of the anti-oxidant in the aromatic amine may also be varied within the limits disclosed. Still further, the stabilized amine may be diluted with inert liquid solvents.

It will be apparent that, by my invention, I am able to provide a class of aromatic amines which are effectively stabilized against oxidation for relatively long periods of time. Thereby, the amines may be stored without material loss in amine or contamination of the amine with deleterious oxidation products and is is unnecessary to schedule the production of the aromatic amines so that they are consumed as rapidly as they are produced. Also, the losses, entailed in purification of oxidized amine, are eliminated or greatly reduced. Accordingly, it is apparent that my invention constitutes a valuable advance in and contribution to the art.

I claim:

1. A composition consisting essentially of an aromatic amine of the formula R—$NH_2$ wherein R is a substituted phenyl radical in which the substituents consist of a member of the class consisting of an $NH_2$ group, both an $NH_2$ group and an alkyl group of 1 to 3 carbon atoms, an alkoxy group of 1 to 3 carbon atoms, and both an alkoxy group of 1 to 3 carbon atoms and an alkyl group of 1 to 3 carbon atoms, and from about 0.01% to about 0.5% of an aromatic mercaptan of the formula R'—SH wherein R' is a member of the class consisting of unsubstituted monomercapto-naphthyl radicals, an unsubstituted phenyl radical, and substituted phenyl radicals in which the substituents consist of a member of the class consisting of 1 to 2 alkyl groups of 1 to 3 carbon atoms, 1 to 2 carboalkoxy groups of 2 to 4 carbon atoms, and both a mercapto group and an alkyl group of 1 to 3 carbon atoms.

2. A composition consisting essentially of an aromatic amine of the formula R—NH$_2$ wherein R is a substituted phenyl radical in which the substituents consist of a member of the class consisting of an NH$_2$ group, both an NH$_2$ group and an alkyl group of 1 to 3 carbon atoms, an alkoxy group of 1 to 3 carbon atoms, and both an alkoxy group of 1 to 3 carbon atoms and an alkyl group of 1 to 3 carbon atoms, and from about 0.01% to about 0.5% of an aromatic mercaptan of the formula R'—SH wherein R' is a substituted phenyl radical in which the substituents consist of 1 to 2 alkyl groups of 1 to 3 carbon atoms.

3. A composition consisting essentially of an aromatic amine of the formula R—NH$_2$ wherein R is a substituted phenyl radical in which the substituents consist of a member of the class consisting of an NH$_2$ group, both an NH$_2$ group and an alkyl group of 1 to 3 carbon atoms, an alkoxy group of 1 to 3 carbon atoms, and both an alkoxy group of 1 to 3 carbon atoms and an alkyl group of 1 to 3 carbon atoms, and from about 0.01% to about 0.5% of an aromatic mercaptan of the formula R'—SH wherein R' is a substituted phenyl radical in which the substituents consist of 1 to 2 methyl groups.

4. A composition consisting essentially of an aromatic amine of the formula R—NH$_2$ wherein R is a substituted phenyl radical in which the substituents consist of a member of the class consisting of an NH$_2$ group, both an NH$_2$ group and an alkyl group of 1 to 3 carbon atoms, an alkoxy group of 1 to 3 carbon atoms, and both an alkoxy group of 1 to 3 carbon atoms and an alkyl group of 1 to 3 carbon atoms, and from about 0.01% to about 0.5% of an aromatic mercaptan of the formula R'—SH wherein R' is a substituted phenyl radical in which the substituents consist of 2 methyl groups.

5. A composition consisting essentially of metaphenylene diamine and from about 0.01% to about 0.5% of an aromatic mercaptan of the formula R'—SH wherein R' is a member of the class consisting of unsubstituted monomercapto-naphthyl radicals, an unsubstituted phenyl radical, and substituted phenyl radicals in which the substituents consist of a member of the class consisting of 1 to 2 alkyl groups of 1 to 3 carbon atoms, 1 to 2 carboalkoxy groups of 2 to 4 carbon atoms, and both a mercapto group and an alkyl group of 1 to 3 carbon atoms.

6. A composition consisting essentially of metaphenylene diamine and from about 0.01% to about 0.5% of an aromatic mercaptan of the formula R'—SH wherein R' is a substituted phenyl radical in which the substituents consist of 1 to 2 alkyl groups of 1 to 3 carbon atoms.

7. A composition consisting essentially of metaphenylene diamine and from about 0.01% to about 0.5% of an aromatic mercaptan of the formula R'—SH wherein R' is a substituted phenyl radical in which the substituents consist of 1 to 2 methyl groups.

8. A composition consisting essentially of metaphenylene diamine and from about 0.01% to about 0.5% of an aromatic mercaptan of the formula R'—SH wherein R' is a substituted phenyl radical in which the substituents consist of 2 methyl groups.

9. A composition consisting essentially of an aromatic amine of the formula R—NH$_2$ wherein R is a monosubstituted phenyl radical in which the substituent is an alkoxy group of 1 to 3 carbon atoms and from about 0.01% to about 0.5% of an aromatic mercaptan of the formula R'—SH wherein R' is a member of the class consisting of unsubstituted mono mercaptonaphthyl radicals, an unsubstituted phenyl radical, and substituted phenyl radicals in which the substituents consist of a member of the class consisting of 1 to 2 alkyl groups of 1 to 3 carbon atoms, 1 to 2 carboalkoxy groups of 2 to 4 carbon atoms, and both a mercapto group and an alkyl group of 1 to 3 carbon atoms.

10. A composition consisting essentially of an aromatic amine of the formula R—NH$_2$ wherein R is a monosubstituted phenyl radical in which the substituent is an alkoxy group of 1 to 3 carbon atoms and from about 0.01% to about 0.5% of an aromatic mercaptan of the formula R'—SH wherein R' is a substituted phenyl radical in which the substituents consist of 1 to 2 alkyl groups of 1 to 3 carbon atoms.

11. A composition consisting essentially of an aromatic amine of the formula R—NH$_2$ wherein R is a monosubstituted phenyl radical in which the substituent is an alkoxy group of 1 to 3 carbon atoms and from about 0.01% to about 0.5% of an aromatic mercaptan of the formula R'—SH wherein R' is a substituted phenyl radical in which the substituents consist of 1 to 2 methyl groups.

12. A composition consisting essentially of an aromatic amine of the formula R—NH$_2$ wherein R is a monosubstituted phenyl radical in which the substituent is an alkoxy group of 1 to 3 carbon atoms and from about 0.01% to about 0.5% of an aromatic mercaptan of the formula R'—SH wherein R' is a substituted phenyl radical in which the substituents consist of 2 methyl groups.

13. A composition consisting essentially of an aromatic amine of the formula R—NH$_2$ wherein R is a substituted phenyl radical in which the substituents consist of a member of the class consisting of an NH$_2$ group, both an NH$_2$ group and an alkyl group of 1 to 3 carbon atoms, an alkoxy group of 1 to 3 carbon atoms, and both an alkoxy group of 1 to 3 carbon atoms and an alkyl group of 1 to 3 carbon atoms, and from about 0.01% to about 0.5% of an aromatic mercaptan of the formula R'—SH wherein R' is a substituted phenyl radical in which the substituents consist of 1 to 2 carboalkoxy groups of 2 to 4 carbon atoms.

14. A composition consisting essentially of an aromatic amine of the formula R—NH$_2$ wherein R is a substituted phenyl radical in which the substituents consist of a member of the class consisting of an NH$_2$ group, both an NH$_2$ group and an alkyl group of 1 to 3 carbon atoms, an alkoxy group of 1 to 3 carbon atoms, and both an alkoxy group of 1 to 3 carbon atoms and an alkyl group of 1 to 3 carbons atoms, and from about 0.01% to about 0.5% of an aromatic mercaptan of the formula R'—SH wherein R' is a substituted phenyl radical in which the substituents consist of 1 to 2 carbomethoxy groups.

15. A composition consisting essentially of an aromatic amine of the formula R—NH$_2$ wherein R is a substituted phenyl radical in which the substituents consist of a member of the class consisting of an NH$_2$ group, both an NH$_2$ group and an alkyl group of 1 to 3 carbon atoms, an alkoxy group of 1 to 3 carbon atoms, and both an alkoxy group of 1 to 3 carbon atoms and an alkyl group of 1 to 3 carbon atoms, and from about 0.01% to about 0.5% of a mercapto-alkyl-benzoate in which the alkyl group contains 1 to 3 carbon atoms.

16. A composition consisting essentially of an aromatic amine of the formula R—NH$_2$ wherein R is a substituted phenyl radical in which the substituents consist of a member of the class consisting of an NH$_2$ group, both an NH$_2$ group and an alkyl group of 1 to 3 carbon atoms, an alkoxy group of 1 to 3 carbon atoms, and both an alkoxy group of 1 to 3 carbon atoms and an alkyl group of 1 to 3 carbon atoms, and from about 0.01% to about 0.5% of a mercapto-methyl-benzoate.

17. A composition consisting essentially of 2,4-toluylene diamine and from about 0.01% to about 0.5% of an aromatic mercaptan of the formula R'—SH wherein R' is a substituted phenyl radical in which the substituents consist of 1 to 2 carboalkoxy groups of 2 to 4 carbon atoms.

18. A composition consisting essentially of 2,4-toluylene diamine and from about 0.01% to about 0.5% of a mercapto-alkyl-benzoate in which the alkyl group contains 1 to 3 carbon atoms.

19. A composition consisting essentially of 2,4-toluylene diamine and from about 0.01% to about 0.5% of a mercapto-methyl-benzoate.

References Cited in the file of this patent

UNITED STATES PATENTS

| | | |
|---|---|---|
| 2,422,484 | Herbst | June 17, 1947 |
| 2,552,466 | Sweeney | May 8, 1951 |